United States Patent [19]

Hayes, Jr. et al.

[11] 3,737,180
[45] June 5, 1973

[54] PIPE CLAMP

[75] Inventors: Thomas J. Hayes, Jr.; David L. Gruller, both of Houston, Tex.

[73] Assignee: Kurier Corporation, Houston, Tex.

[22] Filed: Mar. 22, 1971

[21] Appl. No.: 126,843

[52] U.S. Cl. .................. 285/197, 138/99, 24/273, 24/249 WL, 287/DIG. 8, 285/178, 285/373
[51] Int. Cl. ............................................. F16l 5/02
[58] Field of Search .................. 138/99; 285/178, 285/197, 373; 287/DIG. 8; 24/19, 24, 273, 249 PC, 249 WL

[56] References Cited

UNITED STATES PATENTS

| | | | |
|---|---|---|---|
| 549,774 | 11/1895 | Forst | 138/99 |
| 1,564,382 | 12/1925 | Treiman | 138/99 X |
| 3,258,822 | 7/1966 | Schlesch | 138/99 X |

Primary Examiner—Herbert F. Ross
Attorney—Hyer, Eickenroht, Thompson & Turner

[57] ABSTRACT

A tubular-shaped body is split longitudinally into two sections for positioning on opposite sides of a pipeline. A hinge is located on each side of the body for connecting the two sections along each side of the split for pivotal movement around axes that are parallel and that are parallel to the longitudinal axis of the pipeline. One of the hinges has a removable hinge pin to allow the two sections to be moved apart for placement around the pipeline. The other hinge has a hinge pin with an eccentric portion that will cause the two sections to clamp the pipeline between them when the pin is rotated.

8 Claims, 6 Drawing Figures

PATENTED JUN 5 1973

Thomas J. Hayes, Jr.
David L. Gruller
INVENTORS

BY Hyer, Eickenroht,
Thompson & Turner

ATTORNEYS

Thomas J. Hayes, Jr.
David L. Gruller
INVENTORS

BY *Hyer, Eickenroht,*
*Thompson & Turner*

ATTORNEYS

PIPE CLAMP

This invention relates to pipe clamps generally, and in particular to pipe clamps for mounting on a pipeline to seal an opening in the pipeline, such as a leak or a lateral connection.

Several types of pipe clamps are on the market. Most of these clamps employ nuts and bolts to pull the two sections of the clamp together to clamp the sections on the pipeline and to energize the seal carried by the clamp. One problem with this type of clamp is that the clamping force produced by each clamp can vary depending upon the makeup of the nut or nuts on the holding bolt. If the bolts are too loose, the clamp can slip or the seal may leak. If the bolts are too tight, unnecessary and possibly excessive stress may be placed in the clamp and in the pipeline.

Another problem with this type of clamp is that bolts in tension appear to suffer from stress corrosion at an accelerated rate. Further, clamps that have one or more bolts on their exterior to hold the clamp in place make the clamp difficult to wrap with corrosion protective coverings. It is, of course, desirable to wrap the line and the clamp with such protective coating if at all possible.

It is therefore an object of this invention to provide a pipe clamp that clamps the pipeline with a generally uniform force that does not place an undue amount of stress in the clamp or in the pipeline itself.

It is another object of this invention to provide a pipe clamp that is so designed that none of its parts are subject to accelerated stress corrosion due to high tensile stress concentrations.

It is another object of this invention to provide a pipe clamp that employs no bolts to mount the clamp on a pipeline.

It is another object of this invention to provide a pipe clamp that is of simple construction, that can be quickly and easily mounted on a pipeline, and that is of generally symmetrical shape, thereby allowing the clamp to be easily wrapped with a protective coating of material after it is mounted on the pipeline.

These and other objects, advantages, and features of this invention will be apparent to those skilled in the art from a consideration of this specification, including the attached drawings and appended claims.

Figure 1:
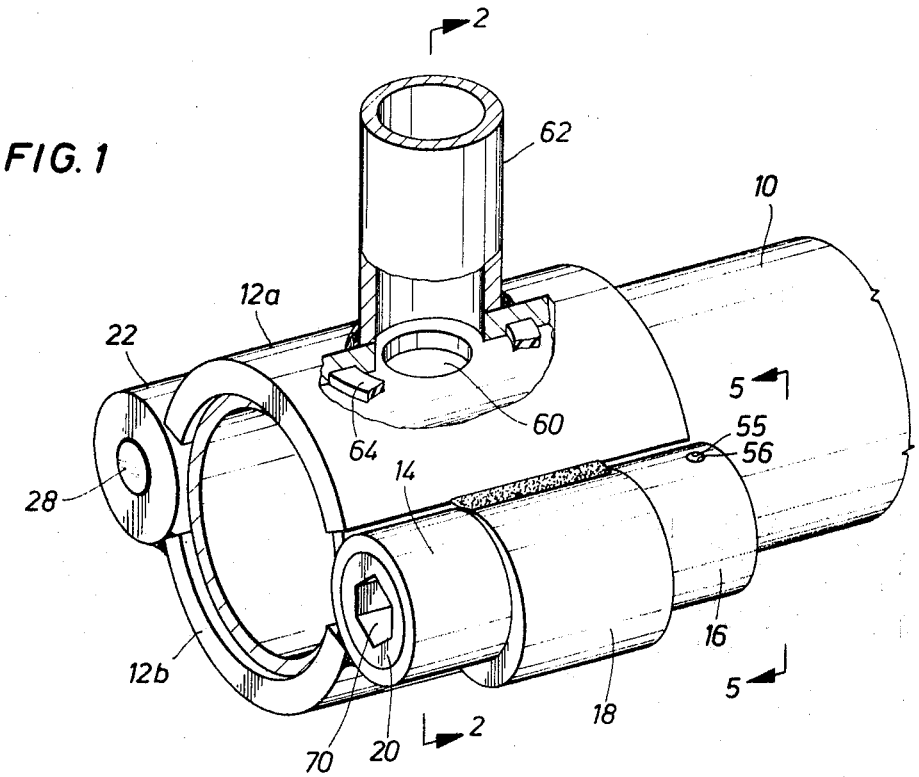
FIG. 1 is an isometric view, partially in elevation and partially in section, of the preferred embodiment of the pipe clamp of this invention installed on a pipeline.

The pipe clamp of this invention can be used to seal leaks in a pipeline or as a clamp-on tee for making lateral connections to a pipeline. The pipe clamp shown in the drawings is a clamp-on tee.

In FIG. 1 the clamp-on tee is shown installed on pipeline 10. The clamp comprises a tubular body that is split longitudinally into two sections 12a and 12b. These sections can be obtained by actually splitting a tubular member longitudinally with the tubular member having the desired dimensions. On the other hand, sections 12a and 12b can be obtained by bending flat plate to the desired shape so that the members have concave surfaces with a radius of curvature substantially equal to the radius of the outer surface of the pipeline upon which the clamp is to be mounted. In the description of the embodiment in the drawings, the two sections 12a and 12b will be referred to jointly as the body of the clamp and the sections individually will be referred to as first and second sections of the body, numbered 12a and 12b, respectively. For simplicity, the space between the adjacent longitudinal edges of the sections will be referred to as the longitudinal split in the body.

First and second hinge means connect the adjacent longitudinal edges of body sections 12a and 12b on opposite sides of the longitudinal split between the two sections to allow the two sections to pivot around longitudinal axes that are parallel to the longitudinal axis of the pipeline upon which the pipeline is mounted. In the embodiment shown, first hinge means includes hinge lugs 14 and 16 that are attached to body section 12b and hinge lug 18 that is connected to body section 12a. Hinge lugs 14 and 16 are spaced apart to receive between them lug 18. The hinge lugs have openings through them and will pivotally connect the two sections of the body together for pivotal movement when hinge pin 20 extends through all three hinge lugs, as shown in FIG. 1.

Figure 4:
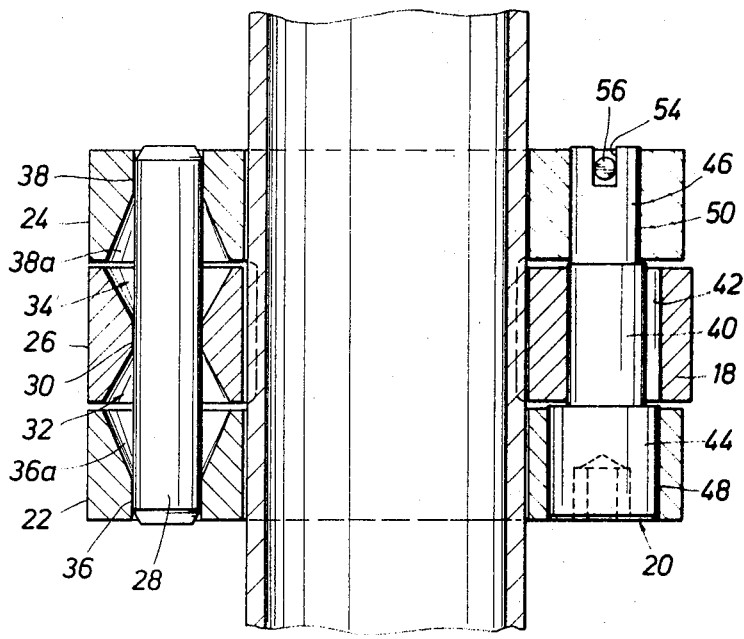
FIG. 4 is a sectional view taken along line 4—4 of FIG. 2.

Second hinge means, which also functions as latch means, includes hinge lugs 22 and 24 that are attached to body section 12b and hinge lug 26 that is attached to body section 12a. Hinge lugs 22 and 24 are spaced apart to receive between them hinge lug 26. All of the lugs have openings through them that will move into axial alignment to receive hinge pin 28 when the hinge is assembled, as shown in FIG. 4. When so assembled, body sections 12a and 12b are connected together along the split on the left-hand side of the body, as viewed in FIGS. 1 and 2, for pivotal movement around the longitudinal axis of pin 28 which is parallel to the longitudinal axis of the pipeline upon which the clamp is mounted.

Figure 3:
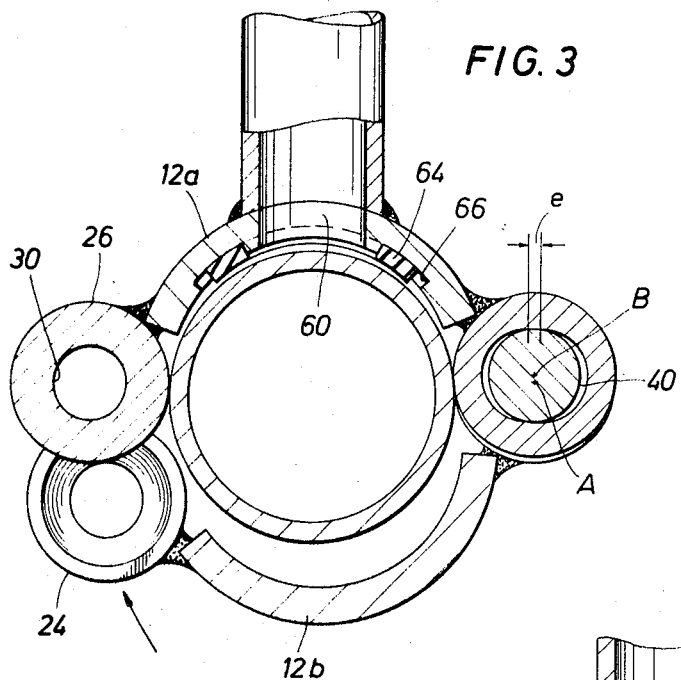
FIG. 3 is a view similar to FIG. 2 but showing the clamp being placed on the pipeline.

Therefore, to position the clamp on pipeline 10, hinge pin 28 is removed to disassemble the second hinge means. The two sections of the body can now be pivoted apart around the longitudinal axis of hinge pin 20 far enough to more over pipeline 10 after which they can be pivoted back into position around the outside surface of the pipe. FIG. 3 shows section 12b being pivoted upwardly to align the openings through the lugs of the second hinge. Pin 28 can then be replaced.

Preferably, the clamp is designed so that when the body sections are moved into engagement with the pipe, the openings through lugs 22, 26, and 24 will not be in exact alignment.

As best seen in FIG. 4, opening 30 in middle lug 26 has lead-in tapers 32 and 34 to guide pin 28 into the bore when the openings in the lugs are not in alignment. Bores 36 and 38 in lugs 22 and 24, respectively, also have lead-in tapers, 36a and 38a, respectively, that face opening 30 of lug 26. This allows pin 28 to be driven into place from either side of the hinge, and as it moves into the last lug, if that lug is out of alignment with the opening in the other two lugs, it will be guided into alignment by lead-in taper 36a or 38a. Hinge pin 28 is beveled at each end to help guide the pin into the openings as the pin is driven into place.

Figure 2:
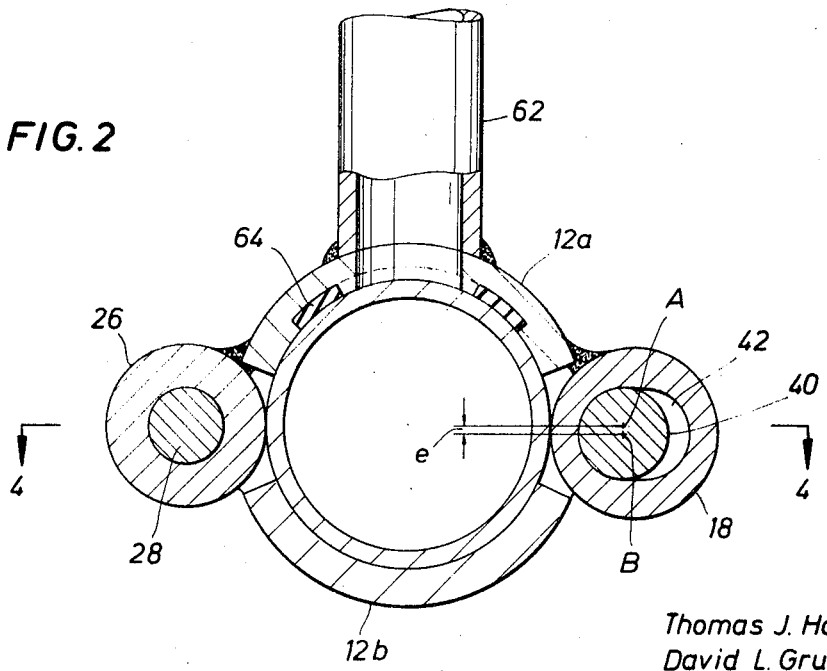
FIG. 2 is a sectional view taken along line 2—2 of FIG. 1.
Figure 6:
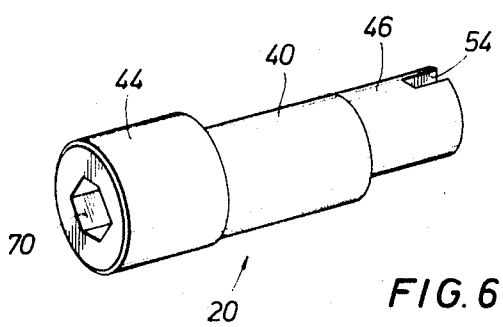
FIG. 6 is an isometric view, in elevation, of one of the hinge pins used with the pipe clamp of FIG. 1.

Thus, the placing of hinge pin 28 in hinge lugs 22, 24, and 26 will, preferably, pull sections 12a and 12b of the clamp into snug engagement with the outside surface of the pipeline upon which the clamp is mounted. This will, at least partially, energize the seal member carried by the clamp. To complete the installation of the clamp in accordance with this invention, hinge pin 20 of the first hinge means is rotated to provide a camming action to force the two sections of the clamp into tighter engagement with the pipeline. This is accomplished in the embodiment shown by providing portion 40 of pin 20 that is located in opening 42 of lug 18 with a longitudinal axis that is eccentric to the longitudinal axis of the portions of the pin located in the openings of the other two lugs. Specifically, portions 44 and 46 of pin 20, as shown in FIGS. 4 and 6, are circular in cross section and fit circular openings 48 and 50 in the lugs with a reasonably small clearance; thus, rotation of the hinge pin will be around the longitudinal axis of portions 44 and 46 of the hinge pin. This longitudinal axis is indicated in FIG. 2 by the letter A. Portion 40 of the pin, however, has a longitudinal axis that is indicated in FIG. 2 by the letter B. This longitudinal axis is offset or eccentric to longitudinal axis A. The amount of this eccentricity is indicated by the letter e. With the hinge pin positioned as shown in FIG. 3 with eccentric axis B above longitudinal axis A, lug 18 will be positioned to provide the maximum distance between the two sections of the body. By rotating hinge pin 20 until the throw or eccentricity of portion 40 is as shown in FIG. 2, lug 18 will be moved relative to the adjacent lugs causing the two sections of the body of the clamp to pivot around the longitudinal axis of pin 28 and move closer together. Thus, the final clamping action is obtained by rotating pin 20 from its first position, as shown in FIG. 3, to the second position, shown in FIG. 2. Since the throw of cam or eccentric section 40 is predetermined, the clamping force imposed on the pipe by the clamp when installed is generally uniform varying only with the variations in the outside diameter of the pipe and the general machining tolerances allowed in devices of this type.

Figure 5:
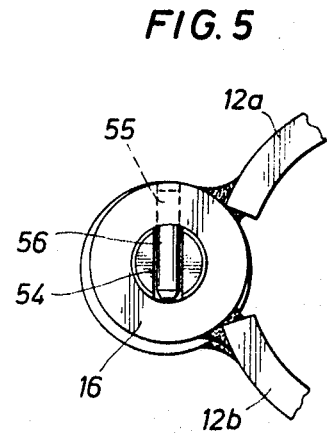
FIG. 5 is a view taken along line 5—5 of FIG. 1.

To allow hinge pin 20 to be rotated, opening 42 in lug 18 is elongated by at least the amount of eccentricity e, so that the shaft can be rotated between the two positions shown. As shown, of course, the shaft cannot be rotated further from the position shown in FIG. 3 in a clockwise direction, nor can the pin be rotated further in a counterclockwise direction when in the position shown in FIG. 3. Therefore, the person installing the clamp, when he has rotated the hinge pin to the clamping position of FIG. 2, cannot rotate the pin any further. As a further indication to the person installing the clamp that he has rotated hinge pin 20 to the proper position, portion 42 of the pin is provided with slot 54 that moves into alignment with opening 55 in lug 16, when the hinge pin is in the position shown in FIG. 2. Lock pin 56 can then be installed, as shown in FIG. 5, to hold the hinge pin in its locking position. Hex socket 70 is formed in the end of pin 20 to receive a wrench for rotating the pin.

Should the outside diameter of the pipe or the machining tolerances of the clamp, or both, be such that the internal diameter of the closed clamp is less that what it should be for the outside diameter of the pipe, the hinge pin can still be rotated to the clamping position and hinge pin 28 will bend sufficiently to allow it. This is another advantage of the lead-in tapers given the openings in the lugs of the second hinge. These tapers reduce the bearing area between the lugs and the hinge pin and increase the distance between the bearing points, thereby decreasing the force required to bend the pin.

As stated above, the clamp shown is constructed as a tee to be used to make a lateral connection to pipeline 10. For this purpose, section 12a of the body is provided with opening 60, and tubular member 62 is welded to section 12a in alignment with opening 60. To provide a seal between the pipeline and the tee, seal member 64, which in the embodiment shown is in the shape of a ring, is located in annular groove 66. So positioned, the seal ring is compressed between pipeline 10 and the body of the clamp to form an annular seal around opening 60 and around the opening to be made in the wall of pipeline 10. This may be done using the well-known method known as "hot tapping," wherein the opening is cut into the side of pipeline 10 after the clamp has been installed on the pipeline so that there will be no need to shut down the operation of the pipeline to make a lateral connection to it. The valves and tapping equipment used in this operation are not shown in the drawings. A leak clamp would differ from the tee clamp in that section 12a would not have opening 60 or tubular member 62 attached thereto. Seal member 64 would be positioned to encircle the leak when the clamp was installed.

In summary, the clamp is installed on pipeline 10 by first removing hinge pin 28 and pivoting the two sections of the body apart far enough to be placed over the pipeline. Hinge pin 28 is then replaced by driving it into the openings of lugs 22, 24, and 26 forcing the openings in these lugs into axial alignment and usually partially energizing seal member 64. At the time the clamp is installed, hinge pin 20 is in the position shown in FIG. 3. After hinge pin 28 has been driven into place, hinge pin 20 is rotated clockwise to the position shown in FIG. 2 to bring the inner concave surfaces of sections 12a and 12b into snug engagement with the outside surface of the pipeline and to further compress seal ring 64 until it is in sealing engagement with both the body of the clamp and the outside surface of the pipeline. Lock pin 56 is then inserted into slot 54 to lock pin 20 from further rotation.

From the foregoing, it can be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe clamp comprising a tubular-shaped body that is longitudinally split into first and second sections for positioning over a pipeline, first hinge means connecting the edges of the two sections along one side of the split for pivotal movement of the sections around an axis parallel to the longitudinal axis of the body and of the pipeline upon which the clamp is to be installed to permit the edges of the two sections along the other side of the split to be moved apart far enough for the clamp to be moved into position to be clamped between the two sections, second hinge means for connecting the two sections along said other side of the split after the clamp is moved into clamping position on a pipeline, and a seal member for positioning between the body and the pipeline, said first hinge means including first and second spaced hinge lugs connected to the first section of the body, a third hinge lug connected to the second section of the body for positioning between the first and second lugs, said third lug being noncircular in cross section and a hinge pin extending through openings provided in the hinge lugs, the portion of the hinge pin in the third lug having a central longitudinal axis that is parallel to and spaced from the longitudinal axis of the portions of the hinge pin in the openings in the first and second lugs so that rotation of the hinge pin from a first to a second position will move the third lug and the second section of the body relative to the first section to force the seal member into sealing engagement with the body and the pipeline and clamp the pipeline between the two sections of the clamp body, the inside wall of said third lug cooperating with said hinge pin when moving from said first position to said second position to provide a cam surface for engagement by said hinge pin in a camming relationship to cause said relative movement, said second hinge means includes cooperating lug members each having an opening therethrough which provides for receipt of a drive pin, said lug members of said second hinge means including spaced apart bearing areas in said openings for supporting said drive pin to permit bending thereof in response to operation of said hinge pin from said first to said second position, said bearing areas being spaced along said pin in said openings so that a substantial part of said pin is free from bearing support within said openings.

2. The pipe clamp of claim 1 in which the third lug is fixed relative to the second section and the opening in the third hinge lug is elongated along an axis generally transverse to the direction of movement of the lug to compress the seal member.

3. The pipe clamp of claim 2 further provided with means to lock the hinge pin from rotation after the pin has been rotated to its second position.

4. The pipe clamp of claim 1 in which the second hinge means includes one hinge lug connected to one section of the body, two hinge lugs connected to the other section and spaced apart to receive the one hinge lug between them, and a hinge pin located in the openings in the lugs.

5. The pipe clamp of claim 1 in which the seal member is located between one section of the body and the pipeline and the body section and the seal member have aligned openings therein through which a lateral connection can be made to the pipeline.

6. A pipe clamp comprising in combination: a tubular-shaped body having first and second body sections adapted to be positioned over and about a pipeline; a seal member mounted in one of said sections for sealing an opening in such a pipeline; eccentric hinge means connecting adjacent edges of said sections to provide pivotal movement of the sections around an axis substantially parallel to the longitudinal axis of the pipeline upon which the clamp is to be installed to permit the clamp to be moved into position on such a pipeline, said eccentric hinge means operable when said clamp is in such a position to urge said seal member into sealing engagement with said pipeline; and latch means for connecting the opposite adjacent edges of said sections to each other when said clamp is in such a position, said latch means including cooperating lug members extending from said opposite adjacent edges and including openings therethrough which provide for receipt of a drive pin when said clamp is in position on such a pipeline, said lug members including spaced apart bearing areas in said openings for supporting said drive pin to permit bending thereof in response to operation of said eccentric hinge means, said bearing areas being spaced along said pin in said openings so that a substantial part of said pin is free from bearing support within said openings.

7. The pipe clamp of claim 6 wherein said cooperating lug members include two spaced apart lugs extending from one of said sections and a third lug extending from the other of said sections and disposed between said spaced apart lugs when said clamp is mounted on said pipeline so that said drive pin may be passed from one of said spaced apart lugs into said third spaced lug, and from said third spaced lug into the other spaced apart lug, and wherein said spaced apart bearing areas are formed on only a part of each of said spaced apart lugs and said third lug.

8. The pipe clamp of claim 7 wherein the opening in each of said spaced apart lugs includes a bearing area adjacent the edges of said spaced apart lugs on opposite ends of said clamp, and a tapered, enlarged section extending from said bearing areas towards said third lug with the enlarged portion thereof adjacent said third lug, and wherein the opening in said third lug includes a central bearing area and enlarged tapered sections extending from said central bearing area to the outer edges of said third lug with the enlarged portions thereof being adjacent said outer edges.

* * * * *